United States Patent Office 3,502,162
Patented Mar. 24, 1970

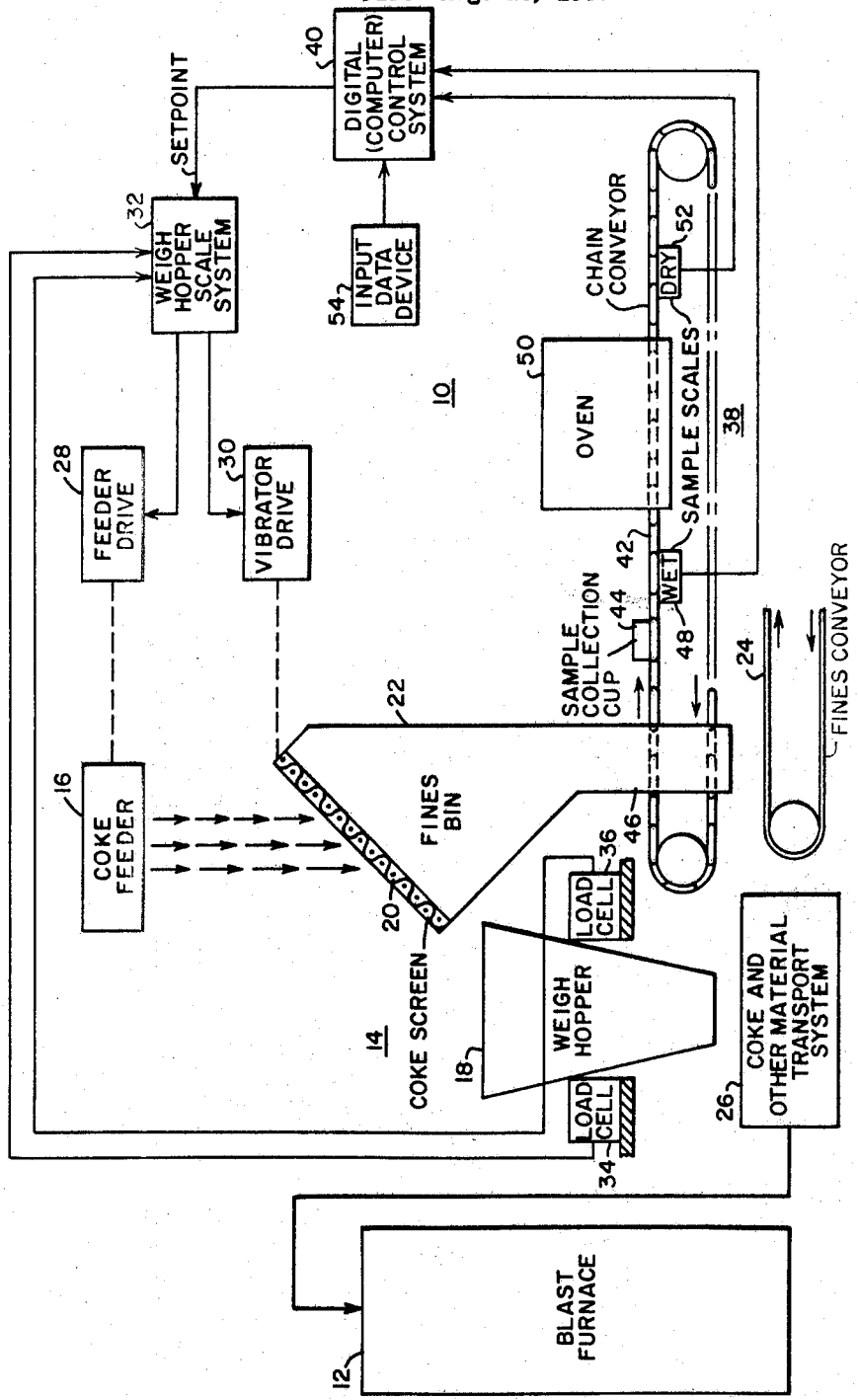

3,502,162
WEIGHT CORRECTING MATERIAL HANDLING
CONTROL FOR VARIABLE WATER CONTENT
MATERIALS USED IN BLAST FURNACES AND
OTHER APPARATUS
William A. Munson, Amherst, N.Y., assignor to Westinghouse Electric Corporation, Pittsburgh, Pa., a corporation of Pennsylvania
Filed Aug. 16, 1967, Ser. No. 661,037
Int. Cl. G01g 19/52
U.S. Cl. 177—50                          12 Claims

ABSTRACT OF THE DISCLOSURE

A material handling control detects the water content of material such as coke. On the basis of the difference between the actual water content and a reference water content value, the material handling control terminates and effects delivery of the amount of material (coke) required to supply a predetermined quantity of a substance (carbon) contained in the material in known proportion for use in a blast furnace or other apparatus.

Background of the invention

The present invention relates to material handling systems and more particularly to systems for controlling the operation of blast furnace material handling systems as a function of the moisture or water content of coke or other porous charge material.

In the operation of an ironmaking blast furnace, carbon containing material is included with iron containing material and fluxes in the furnace charge. The carbon acts as an iron oxide reducing agent and further produces the heat needed for reduction to take place. The fluxes such as dolomite act as process catalysts and impurity removing agents. Usually, the carbon is supplied in coke, sinter or pellets or some combination of these charge materials. Similarly, the iron is supplied in ore, sinter or pellets or a combination of these charge materials.

The blast furnace process is essentially a continuous batch process. Thus, batches of materials are repeatedly charged into the furnace on a periodic basis as hot metal, slag and hot gases are produced. Batches of hot metal and slag are tapped from the furnace from time to time while hot gas outflow occurs continuously.

Maximum furnace productivity and operating efficiency can be achieved if predetermined hot metal, slag and hot gas endpoint conditions are met. In particular, the endpoint chemistry of the hot metal should meet specifications for inputting to the steelmaking furnace such as a basic oxygen furnace, and the endpoint chemistry of the slag should meet specifications making the slag salable as a separate product. Recent evidence points to the fact that the hot metal should also acquire an endpoint temperature or temperature range predetermined to be correlated with the specified endpoint chemistry. Since blast furnace gas is used elsewhere in the steel plant for heating purposes, it should be characterized with a B.t.u. content within a predetermined range.

To meet productivity and efficiency objectives, it is essential that the ironmaking process be held in thermal and chemical balance. In turn, process balance requires control over the quantity of materials charged into the furnace. It is particularly important that a predetermined ratio of input carbon to input iron be held reasonably accurately on a continuing basis. If material inputs are imbalanced and particularly if the input carbon-iron ratio is imbalanced, the thermal and/or chemical balance of the process is disturbed. As a consequence one or more of the endpoint conditions would deviate from specifications causing loss in productivity or operating efficiency.

In the conventional blast furnace material handling system, scheduled amounts of charge materials are weighed and transported to the furnace top by a skip hoist or conveyor belt system and the charging process thus generally provides for thermal and chemical balance in the furnace operation. However, some degree of imbalance often results in the furnace operation for various reasons.

In particular, undesirable or unacceptable process imbalance can result from the facts of varying moisture content in porous input materials, principally the carbon containing materials such as coke and/or sinter. For example, varying atmospheric conditions can cause the weight percentage of water in bin stored coke to vary typically over a range of 2% to 15%. The prescribed weight of coke to be charged into the furnace can thus have a corresponding range variation in total carbon weight. Accordingly, although accurate weighing of coke and iron containing materials can result in accurate maintenance of a fixed coke to iron ratio, a variation in coke water content will cause the input carbon/iron ratio to vary and thereby produce a corresponding degree of furnace process imbalance. Similarly, for general background purposes, it is also noted that problems like the carbon iron ratio problem in the blast furnace process can and often do exist in other processes in which variable water content materials are used.

Summary of the invention

A material handling control for a blast furnace or other processing apparatus includes means for measuring and effecting delivery of a variable water content material and means for extracting one or more samples of the material and for making a water content analysis of each sample. A digital or other controller responds to the sample water content results and to a process demand defining a demand amount of a substance contained in the material in known proportion and operates the measuring the delivery means to transport the quantity of the material required to meet the process demand for the substance. Improved productivity and efficiency are thereby enabled.

It is therefore an object of the invention to provide a novel material handling control system which provides weight correction for variable water content materials and thereby enables improved efficiency and productivity to be realized in the process in which the materials are used.

It is another object of the invention to provide a novel material handling control system which provides weight correction for variable water content materials and thereby enables preselected quantities of one or more substances contained within the materials to be delivered to a process in which the materials are used.

It is a more particular object of the invention to provide a novel material handling control system which provides weight correction for variable water content containing materials such as coke and sinter and thereby enables improved efficiency and productivity in ironmaking.

Another object of the invention is to provide a novel blast furnace material handling control system which enables the furnace input carbon/iron ratio to be held more closely to a prespecified value.

A further object of the invention is to provide a novel blast furnace material handling control system which enables the furnace to be operated with improved thermal and chemical balance and thereby enables overall improvement in the quality of delivered products including hot metal, slag and blast furnace gas.

These and other objects of the invention will become more apparent upon consideration of the following detailed description along with the attached drawing.

Brief description of the drawing

The only figure shows a schematic diagram of a weight correcting material handling system arranged in accordance with the principles of the invention to control the delivery of materials to an ironmaking blast furnace.

Description of the preferred embodiment

More specifically, there is shown in the drawing a material handling control system 10 employed in accordance with the principles of the present invention to supply measured amounts of predetermined materials for charging an ironmaking blast furnace 12. The material handling control system 10 or similar systems can also be employed with other end use apparatus such as sintering machines or pellet balling machines.

A material delivery system 14 is provided to supply the furnace 12 with porous material, in this case carbon containing material in the form of coke. The coke is fed from a feeder 16 to a weight hopper 18 over a coke screen 20 which diverts the coke fines to a bin like device 22. The fines drop from the bin 22 to a belt conveyor 24 for transfer to storage and ultimate use in a sintering or pellet balling machine (not shown).

From the weight hopper 18, the coke is transferred to a transport system 26 such as a skip hoist system (not specifically indicated) or a conveyor belt system (not specifically indicated) for delivery to the small charging bell at the top of the blast furnace 12. If a conveyor belt system is used, scales (not shown) associated with it can operate as detectors for the coke weighing function and the weigh hopper 18 can be replaced by a simple hopper or feeder device. It is also noted that additional hopper and/or feeder devices (not shown) would normally be associated with the transport system 26 to deliver iron containing and other materials to the furnace top.

Screening is required for coke in order to prevent large amounts of fines from being charged into the blast furnace 12 where they tend to mix with and contaminate the furnace product gases. In the present embodiment, the fines obtained by screening provide a convenient source for sampling for water content analysis as subsequently described. In other applications of the invention, screening may not be required for the particular porous material under control, and in that event the material delivery system 14 can be simplified by using only a hopper-like device without a screening device. Sampling would then be made from the material supplied by the hopper-like device.

In operation of the material handling control system 10, a feeder drive 28 is initiated to start coke flow from the coke feeder 16 to the coke screen 20. Simultaneously, a vibrator drive 30 is started to operate the screen 20 which causes coke fines to fall into the bin 22 and screened coke to roll and bounce into the weigh hopper 18. Start and stop functions are supplied by a conventional weigh hopper scale system 32 which is provided with a weight setpoint defining the quantity of coke to be supplied during each operation of the material delivery system 14. The weigh hopper 18 is conventionally provided with load cells 34 and 36 to supply feedback weight signals to the weigh hopper scale system 32.

When the hopper 18 contains the setpoint coke weight less the known normal screen buildup amount, the feeder drive 28 is stopped and coke flow to the screen 20 stops. The vibrator drive 30 continues to operate for a predetermined time delay period which assures that all of the screen buildup coke existing at feeder shutdown is transferred to the hopper 18. After screen stoppage, the weigh hopper 18 is opened to discharge the contained coke to the transport system 26.

As previously indicated, variable water content in the coke can result in substantial variation in the carbon input to the blast furnace 12 from charge to charge even though the charge weight of coke is held substantially constant. In order to provide weight correction control in compensation for charging error resulting from coke water content variation, a water content detection system 38 periodically makes an analysis of a sample of the coke fines. Further, a digital control system 40 such as appropriate digital logic circuitry or a small conventional digital computer control system or an assigned part of a larger conventional digital computer control system, operates on the sample water content data in conjunction with inputed carbon demand weight (or its equivalent) to define and control the amount of coke required at the detected coke wet condition to meet the carbon demand. Since the weigh hopper scale system 32 is employed in this case to control the feeder and vibrator drives 28 and 30, the digital control system 40 preferably generates the setpoint signal for the weigh hopper scale system 32 in making the ultimate control on the coke flow.

The water content detection system 38 includes a chain conveyor 42 operated by a suitable drive to carry at least one sample collection cup 44 through a downcomer chute 46 from the fines bin 22. The chain 42 is driven at a predetermined rate such as three feet per minute which enables an adequately large coke fines sample such as two or three cubic inches to be collected in the cup 44 as it crosses through the chute 46. In cases where fines of the material under controlled flow are not normally produced as previously indicated, large pieces of the material can be sampled and suitably processed such as by reduction to fines and subsequent water detection steps or by the water detection step alone.

After the cup 44 exits from the chute 46, it passes over a conventional conveyor scale 48 such as a device of the type supplied by the Transweigh Division of Compudyne which produce a signal representing the weight of the sample in the wet condition with compensation for the cup weight. The cup 44 then passes through a conveyor line oven 50 which evaporates the water contained in the sample coke fines. The cup 44 is next advanced over another conventional conveyor scale 52 which produces a cup weight compensated signal representing the weight of the sample in the dry condition.

The wet and dry weight signals are operated upon in the digital control system 40 to provide the water weight and the percentage water weight in the sample. The fines wet condition as determined from one or more samples is normally adequately representative of the wet condition of all of the coke in the batch then being supplied and the percentage water weight calculated for the sample or samples can thus be extended to define the total weight of coke required to supply the demand amount of carbon. For example, the demand carbon weight (or its equivalent) can be generated by a suitable digital input data device 54 and applied to the digital control system 40. As one example equivalent, the demand carbon can be defined in terms of the demand weight of coke having a known carbon weight percentage content and a reference water content value of 0% or any other preselected reference percentage.

The following formula can be used in calculating the required amount of coke at the detected wet coke condition:

$$C_w = C_d + W \times C_w$$

where:

$C_w$ = the demand coke at the detected wet condition.
$C_d$ = demand coke in the dry condition (or other reference value).
$W$ = weight percentage of water in $C_w$.

Once the required weight of coke is calculated, an analog setpoint signal is generated and applied to the weigh hopper scale system 32 which then controls the feeder and vibrator drives 28 and 30 until the setpoint coke weight is transferred to the weigh hopper 18. The transport system 26 is then operated as previously described in charging the blast furnace 12.

In order to obtain sensitive drying control and in order to avoid combustion processes, the oven 50 is preferably in the form of an electric heating device such as an electric resistance furnace about five or six feet long. Further, it is preferably provided with an evacuation system (not indicated) which enables water to boil at about 150° F. or less in order to facilitate the coke drying process. Flexible entry and exit doors (not indicated) on the furnace enable the sample cup 44 to be advanced by the chain 42 through the oven 50. The chain drive rate is adequately slow to allow drying of the sample during its transit through the oven 50. If different chain drive rates are required for sample collection and sample drying, suitable sensing circuitry (not shown) can be employed to initiate the respectively required chain drive rates as the sample cup 44 enters the chute 46 and the oven 50.

The rate at which coke samplings are made is at least one sampling for each coke batch or for each of a predetermined group of successive coke batches and preferably at least one sampling for each weigh hopper operation made in effecting a batch supply. The digital control system 40 averages or otherwise extends the results of plural samplings from each hopper load or from successive hopper loads in calculating the wet condition W of the coke batch or each coke hopper load and controlling the operation of the coke feeder 16 and the coke screen 20. If the control is applied to a sintering machine, or a pellet balling machine or the like, the process is operated continuously rather than on a batch basis and similar considerations apply to determining the sampling frequency.

If the transport system 26 is a conveyor belt type arrangement, the sampling frequency is preferably made to equal at least the frequency with which batches of coke are transported to the top of the blast furnace 12. In either transport system case, the frequency of sampling can be less than the batch frequency particularly where successive batches of coke are known to be coming from the same storage bin or other source so as to make it likely that the successive batches will have the same wet condition.

As a result of operation of the material handling control system 10, the blast furnace 12 is operated with improved thermal and chemical balance because more accurate control is placed on the input carbon/iron ratio. Better furnace operating efficiency and productivity are thus realized. Similar beneficial results are realized in other applications of the invention.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A material handling control system for controlling the amount of porous material containing a known amount of carbon delivered to a blast furnace by a delivery and transport system, said material handling control system including means for weighing the amount of a porous material fed to the delivery and transport system, means for obtaining at least one sample of the porous material, means for weighing the sample in the wet condition, means for drying the sample, means for weighing the sample in the dry condition, and means responsive to outputs from all of said weighing means for controlling the flow of the porous material and the amount of the carbon supplied to the delivery and transport system.

2. A material handling control system as set forth in claim 1 wherein said flow controlling means includes a controller operating on the sample weight outputs and a demand weight for the carbon containing material at a reference water content value to determine a carbon containing material weight corrected to correspond to demand carbon weight at the actual water content value of the carbon containing material.

3. A material handling control system as set forth in claim 1 wherein the end use apparatus is a blast furnace, the porous material is a carbon containing material and the substance is carbon, said flow controlling means includes a controller operating on the sample weight outputs and a demand weight for the carbon containing material at a reference water content value, said flow controlling means further includes a weigh scale system responsive to the first mentioned weighing means and an output from said controller representing a carbon containing material weight corrected to correspond to demand carbon weight at the actual water content value of the carbon containing material.

4. A material handling control system as set forth in claim 3 wherein the delivery and transport system includes a screening device, and said sample obtaining means includes means for collecting a sample of carbon containing material fines from said screening device.

5. A material handling control system as set forth in claim 4 wherein said sample obtaining means includes conveyor means having a sample container supported thereon for movement through a fines sampling region, and said drying means includes an oven disposed about said conveyor means at a predetermined location.

6. A material handling control system as set forth in claim 4 wherein the carbon containing material is coke and said screen device is a coke screen device, said collecting means being operative to collect a coke fines sample.

7. A material handling control system as set forth in claim 3 wherein said controller is a digital control system and the corrected carbon containing material weight output from said digital control system is an analog setpoint signal for said weigh scale system.

8. A material handling control system as set forth in claim 1 wherein the end use apparatus is a blast furnace, the porous material is a carbon containing material, the substance is carbon and the delivery and transport system includes a weigh hopper and a screening device, said flow controlling means includes a controller operating on the sample weight outputs and a demand weight value for the carbon containing material, said flow controlling means further includes a weigh hopper scale system which responds to the first mentioned weighing means and an output from said controller representing a carbon containing material weight corrected to correspond to demand carbon weight at the actual water content value of the carbon containing material, and said sample obtaining means includes means for collecting a sample of carbon containing material fines from said screening device.

9. A material handling control system as set forth in claim 8 wherein the delivery and transport system includes a feeder device, said weigh hopper scale system is operative to control said feeder device and said screening device in effecting control over the flow of the carbon containing material.

10. A material handling control system as set forth in claim 1 wherein the end use apparatus is a blast furnace, the porous material is a carbon containing material and the substance is carbon, said sampling means being operative to obtain at least one sample for each batch of carbon containing material processed by said delivery and transport system.

11. A material handling control system for controlling the amount of a porous material containing a known amount of carbon delivered to a blast furnace by a delivery and transport system, said material handling control system including means for weighing the amount of a porous material fed to the delivery and transport system, means for determining the water content of the porous material, means responsive to the outputs of said weighing and water determining means for controlling the flow of the porous material and the amount of carbon supplied to the delivery and transport system.

12. A material handling control system as set forth in claim 11 wherein said flow controlling means includes a controller responsive to output indication of said moisture determining means and responsive to a demand weight for the carbon containing material at a reference water content value for the purpose of determining a carbon containing material weight corrected to correspond to desired carbon weight at the actual water content value of the carbon containing material.

References Cited

UNITED STATES PATENTS

| | | |
|---|---|---|
| 2,765,160 | 10/1956 | Dietert et al. |
| 2,863,191 | 12/1958 | Dietert et al. |
| 3,156,312 | 11/1964 | Heltzel et al. _____ 177—70 |
| 3,163,520 | 12/1964 | Collin et al. _____ 266—27 X |
| 3,170,677 | 2/1965 | Phister et al. _____ 177—70 XR |
| 3,173,505 | 3/1965 | Thorsson et al. |
| 3,252,530 | 5/1966 | Bale _____ 177—70 X |
| 3,259,199 | 7/1966 | Noble et al. _____ 177—70 |

GEORGE H. MILLER, JR., Primary Examiner

RICHARD B. WILKINSON, Assistant Examiner

U.S. Cl. X.R.

214—18; 266—27